United States Patent
Sato

(10) Patent No.: US 11,012,347 B2
(45) Date of Patent: May 18, 2021

(54) COMMUNICATION APPARATUS, COMMUNICATION CONTROL METHOD, AND COMMUNICATION SYSTEM FOR MULTILINK COMMUNICATION SIMULTANEOUSLY USING A PLURALITY OF COMMUNICATION PATHS

(71) Applicant: NEC CORPORATION, Tokyo (JP)

(72) Inventor: Tomoaki Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/496,729

(22) PCT Filed: Feb. 13, 2018

(86) PCT No.: PCT/JP2018/004825
§ 371 (c)(1),
(2) Date: Sep. 23, 2019

(87) PCT Pub. No.: WO2018/179922
PCT Pub. Date: Oct. 4, 2018

(65) Prior Publication Data
US 2020/0036625 A1    Jan. 30, 2020

(30) Foreign Application Priority Data
Mar. 28, 2017   (JP) .............................. JP2017-062917

(51) Int. Cl.
*H04L 12/707* (2013.01)
*H04L 12/46* (2006.01)
(Continued)

(52) U.S. Cl.
CPC .......... *H04L 45/24* (2013.01); *H04L 12/4679* (2013.01); *H04L 45/125* (2013.01); *H04L 47/14* (2013.01); *H04L 47/805* (2013.01)

(58) Field of Classification Search
None
See application file for complete search history.

(56) References Cited

U.S. PATENT DOCUMENTS 7,336,605 B2    2/2008  Bruckman et al.
8,335,230 B2 *  12/2012 Saigo .................... H04L 5/0032
                                                   370/443
(Continued)

FOREIGN PATENT DOCUMENTS

EP    2 520 052 B1    2/2015
JP    2006-115392 A   4/2006
(Continued)

OTHER PUBLICATIONS

International Search Report for PCT/JP2018/004825, dated May 15, 2018.

*Primary Examiner* — Anh Ngoc M Nguyen

(57) ABSTRACT

In a communication apparatus (10), a determination unit (12) determines, from a plurality of candidate communication paths other than one of a plurality of communication paths used for multilink communication, a distribution-destination communication path based on the free bandwidths of the respective candidate communication paths. Further, a distribution control unit (11) executes control for distributing a setting flow for the one communication path to the determined distribution-destination communication path.

13 Claims, 14 Drawing Sheets

| Port Identifier | Nominal Bandwidth | Bandwidth | Free Bandwidth | LAG assigned VID | Throughput |
|---|---|---|---|---|---|
| A | 100Mbps | 50Mbps | 0Mbps | 100 | 10Mbps |
|   |         |        |        | 200 | 20Mbps |
|   |         |        |        | 300 | 30Mbps |
|   |         |        |        | 400 | 0Mbps |
|   |         |        |        | 500 | 0Mbps |
|   |         |        |        | 600 | 0Mbps |
| B | 100Mbps | 100Mbps | 5Mbps | 100 | 0Mbps |
|   |         |        |        | 200 | 0Mbps |
|   |         |        |        | 300 | 0Mbps |
|   |         |        |        | 400 | 40Mbps |
|   |         |        |        | 500 | 55Mbps |
|   |         |        |        | 600 | 0Mbps |
| C | 100Mbps | 100Mbps | 50Mbps | 100 | 0Mbps |
|   |         |        |        | 200 | 0Mbps |
|   |         |        |        | 300 | 0Mbps |
|   |         |        |        | 400 | 0Mbps |
|   |         |        |        | 500 | 0Mbps |
|   |         |        |        | 600 | 50Mbps |

(51) Int. Cl.
*H04L 12/729* (2013.01)
*H04L 12/801* (2013.01)
*H04L 12/927* (2013.01)

(56) References Cited

U.S. PATENT DOCUMENTS

| | | | |
|---|---|---|---|
| 9,455,927 | B1 | 9/2016 | Nayak et al. |
| 2008/0232276 | A1* | 9/2008 | Guntur .................. H04L 45/125 |
| | | | 370/256 |
| 2009/0201809 | A1* | 8/2009 | Sommerville .......... H04L 45/00 |
| | | | 370/232 |
| 2013/0155865 | A1* | 6/2013 | Xu .......................... H04L 45/50 |
| | | | 370/237 |
| 2016/0205041 | A1* | 7/2016 | Lee ........................ H04L 45/245 |
| | | | 709/226 |

FOREIGN PATENT DOCUMENTS

| | | |
|---|---|---|
| JP | 2013-141082 A | 7/2013 |
| JP | 2015-050527 A | 3/2015 |
| WO | 2013/125177 A1 | 8/2013 |
| WO | 2013/161213 A1 | 10/2013 |

\* cited by examiner

| Flow Number | MAC Address | VLAN ID | Transmit Port |
|---|---|---|---|
| 1 | 00-00-01-00-00-aa | 100 | A |
| 2 | 00-00-01-00-00-bb | 200 | A |
| 3 | 00-00-01-00-00-cc | 300 | A |
| 4 | 00-00-01-00-00-dd | 400 | B |
| 5 | 00-00-01-00-00-ee | 500 | B |
| 6 | 00-00-01-00-00-ff | 600 | C |

| Port Identifier | Nominal Bandwidth | Bandwidth | Free Bandwidth | LAG assigned VID | Throughput |
|---|---|---|---|---|---|
| A | 100Mbps | 50Mbps | 0Mbps | 100 | 10Mbps |
| | | | | 200 | 20Mbps |
| | | | | 300 | 30Mbps |
| | | | | 400 | 0Mbps |
| | | | | 500 | 0Mbps |
| | | | | 600 | 0Mbps |
| B | 100Mbps | 100Mbps | 5Mbps | 100 | 0Mbps |
| | | | | 200 | 0Mbps |
| | | | | 300 | 0Mbps |
| | | | | 400 | 40Mbps |
| | | | | 500 | 55Mbps |
| | | | | 600 | 0Mbps |
| C | 100Mbps | 100Mbps | 50Mbps | 100 | 0Mbps |
| | | | | 200 | 0Mbps |
| | | | | 300 | 0Mbps |
| | | | | 400 | 0Mbps |
| | | | | 500 | 0Mbps |
| | | | | 600 | 50Mbps |

| Flow Number | MAC Address | VLAN ID | Transmit Port |
|---|---|---|---|
| 1 | 00-00-01-00-00-aa | 100 | A |
| 2 | 00-00-01-00-00-bb | 200 | A |
| 3 | 00-00-01-00-00-cc | 300 | C |
| 4 | 00-00-01-00-00-dd | 400 | B |
| 5 | 00-00-01-00-00-ee | 500 | B |
| 6 | 00-00-01-00-00-ff | 600 | C |

| Port Identifier | Nominal Bandwidth | Bandwidth | Free Bandwidth | LAG assigned VID | Throughput |
|---|---|---|---|---|---|
| A | 100Mbps | 50Mbps | 20Mbps | 100 | 10Mbps |
| | | | | 200 | 20Mbps |
| | | | | 300 | 0Mbps |
| | | | | 400 | 0Mbps |
| | | | | 500 | 0Mbps |
| | | | | 600 | 0Mbps |
| B | 100Mbps | 100Mbps | 5Mbps | 100 | 0Mbps |
| | | | | 200 | 0Mbps |
| | | | | 300 | 0Mbps |
| | | | | 400 | 40Mbps |
| | | | | 500 | 55Mbps |
| | | | | 600 | 0Mbps |
| C | 100Mbps | 100Mbps | 20Mbps | 100 | 0Mbps |
| | | | | 200 | 0Mbps |
| | | | | 300 | 30Mbps |
| | | | | 400 | 0Mbps |
| | | | | 500 | 0Mbps |
| | | | | 600 | 50Mbps |

| Flow Number | MAC Address | VLAN ID | Transmit Port | Change Flag | Changed Transmit Port |
|---|---|---|---|---|---|
| 1 | 00-00-01-00-00-aa | 100 | A | OFF | |
| 2 | 00-00-01-00-00-bb | 200 | A | OFF | |
| 3 | 00-00-01-00-00-cc | 300 | A | OFF | |
| 4 | 00-00-01-00-00-dd | 400 | B | OFF | |
| 5 | 00-00-01-00-00-ee | 500 | B | OFF | |
| 6 | 00-00-01-00-00-ff | 600 | C | OFF | |

Fig. 12

| Flow Number | MAC Address | VLAN ID | Transmit Port | Change Flag | Changed Transmit Port |
|---|---|---|---|---|---|
| 1 | 00-00-01-00-00-aa | 100 | A | OFF | |
| 2 | 00-00-01-00-00-bb | 200 | A | OFF | |
| 3 | 00-00-01-00-00-cc | 300 | A | ON | C |
| 4 | 00-00-01-00-00-dd | 400 | B | OFF | |
| 5 | 00-00-01-00-00-ee | 500 | B | OFF | |
| 6 | 00-00-01-00-00-ff | 600 | C | OFF | |

Fig. 13

COMMUNICATION APPARATUS, COMMUNICATION CONTROL METHOD, AND COMMUNICATION SYSTEM FOR MULTILINK COMMUNICATION SIMULTANEOUSLY USING A PLURALITY OF COMMUNICATION PATHS

CROSS REFERENCE TO RELATED APPLICATIONS

This application is a National Stage of International Application No. PCT/JP2018/004825 filed Feb. 13, 2018, claiming priority based on Japanese Patent Application No. 2017-062917 filed Mar. 28, 2017, the disclosure of which is incorporated herein in its entirety by reference.

TECHNICAL FIELD

The present disclosure relates to a communication apparatus, a communication control method, and a communication system.

BACKGROUND ART

In order to increase transmission capacity, link aggregation communication (i.e., multilink communication) simultaneously using a plurality of communication paths has been proposed (e.g., Patent Literature 1). In the technique disclosed in Patent Literature 1, a flow assigned to the first communication path of two communication paths is distributed to the second communication path when a predetermined condition is satisfied.

CITATION LIST

Patent Literature

Patent Literature 1: International Patent Publication No. WO2013/161213
Patent Literature 2: U.S. Pat. No. 9,455,927
Patent Literature 3: European Patent No. EP2520052
Patent Literature 4: U.S. Pat. No. 7,336,605

SUMMARY OF INVENTION

Technical Problem

Incidentally, in the current situation where the development of multimedia has been advanced, the volume of traffic is considerably increased and thus a further expansion of transmission capacity has been desired. Therefore, it is considered that aggregation communication simultaneously using a large number of communication paths will become widespread.

However, it is assumed in the aforementioned related art that two communication paths are used, and thus there is a possibility that when many communication paths are simultaneously used in aggregation communication, a flow cannot be distributed to a suitable communication path.

An object of the present disclosure is to provide a communication apparatus, a communication control method, and a communication system capable of distributing a flow to a suitable communication path.

Solution to Problem

A communication apparatus according to a first aspect of the present disclosure is a communication apparatus configured to perform multilink communication simultaneously using a plurality of communication paths, in which one or a plurality of flows are set for each communication path, with a communication partner apparatus, the communication apparatus including: a distribution control unit configured to execute control for distributing a setting flow for a first communication path of a plurality of communication paths to a distribution-destination communication path different from the first communication path; and a determination unit configured to determine the distribution-destination communication path from a plurality of candidate communication paths other than the first communication path included in the plurality of communication paths based on free bandwidths of the respective candidate communication paths.

A communication control method according to a second aspect of the present disclosure is a communication control method executed by a communication apparatus configured to perform multilink communication simultaneously using a plurality of communication paths, in which one or a plurality of flows are set for each communication path, with a communication partner apparatus, the communication control method including: determining a distribution-destination communication path from a plurality of candidate communication paths other than a first communication path included in the plurality of communication paths based on free bandwidths of the respective candidate communication paths; and executing control for distributing a setting flow for the first communication path to the distribution-destination communication path.

A communication system according to a third aspect of the present disclosure includes: a first communication apparatus; a second communication apparatus configured to perform multilink communication simultaneously using a plurality of communication paths, in which one or a plurality of flows are set for each communication path, with the first communication apparatus; and a plurality of transmission apparatuses configured to be located in a plurality of respective communication sections included in the plurality of respective communication paths, in which each of the transmission apparatuses transmits information about a current available bandwidth for the respectively corresponding communication sections to the first communication apparatus, and the first communication apparatus calculates a free bandwidth of each of the communication paths based on the current available bandwidth transmitted from each of the transmission apparatuses, determines a distribution-destination communication path from a plurality of candidate communication paths other than a first communication path included in the plurality of communication paths based on free bandwidths of the respective candidate communication paths, and executes control for distributing a setting flow for the first communication path to the distribution-destination communication path.

Advantageous Effects of Invention

According to the present disclosure, it is possible to provide a communication apparatus, a communication control method, and a communication system capable of distributing a flow to a suitable communication path.

BRIEF DESCRIPTION OF DRAWINGS

FIG. 5 shows an example of a forwarding table according to the second example embodiment;

FIG. 6 shows an example of a management table according to the second example embodiment;

FIG. 10 is a diagram for explaining rewriting of the forwarding table;

FIG. 11 is a diagram for explaining rewriting of the management table;

FIG. 12 shows an example of the forwarding table according to a <Modified example> of the second example embodiment;

FIG. 13 shows an example of the forwarding table according to the <Modified example> of the second example embodiment.

DESCRIPTION OF EMBODIMENTS

Example embodiments will be described hereinafter with reference to the drawings. Note that the same or equivalent components will be denoted by the same reference symbols throughout the example embodiments, and overlapping descriptions will be omitted.

First Example Embodiment

<Outline of Communication System>

Figure 1:
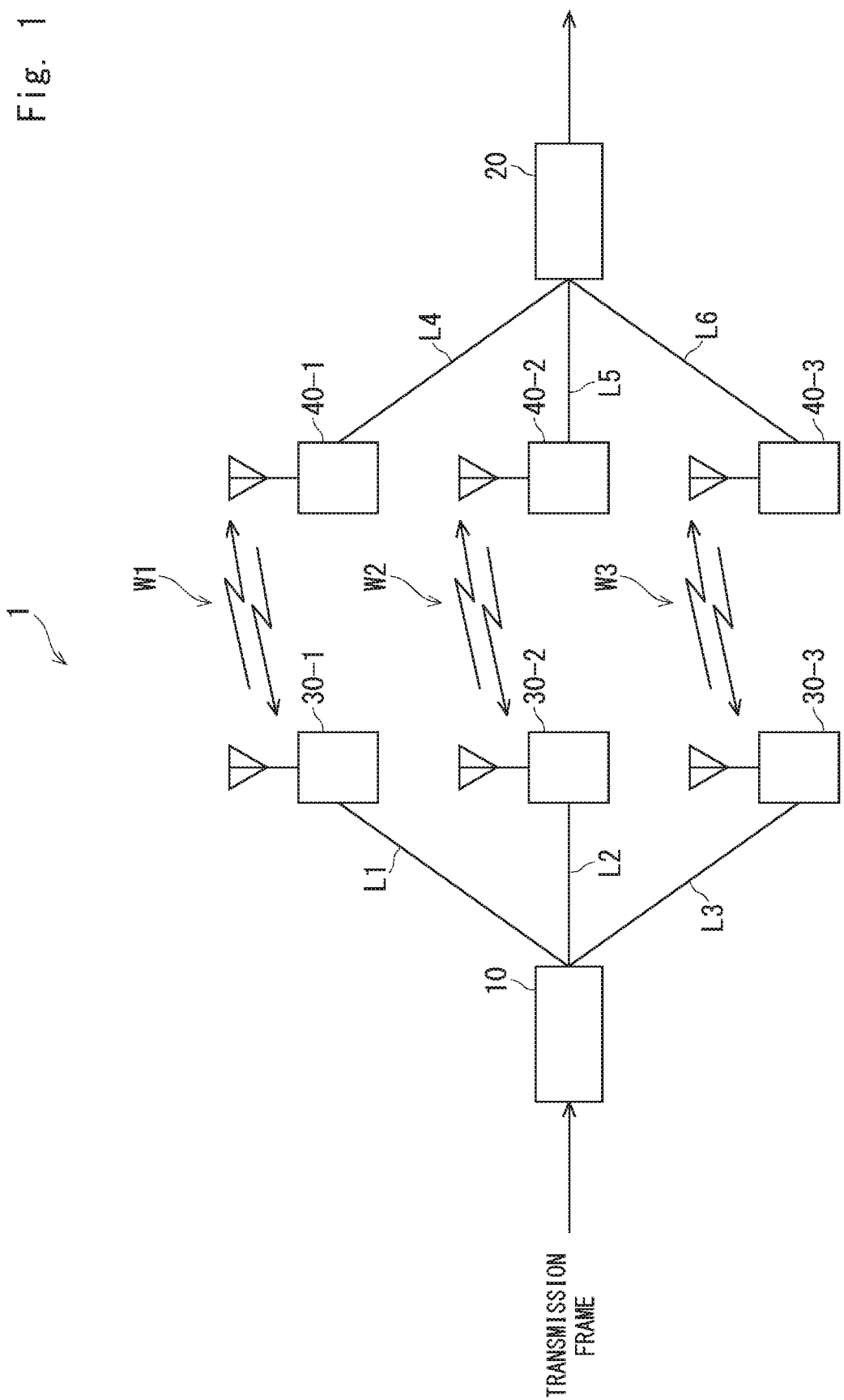
FIG. 1 shows an example of a communication system according to a first example embodiment.

FIG. 1 shows an example of a communication system according to a first example embodiment. In FIG. 1, a communication system 1 includes a communication apparatus 10, a communication apparatus 20, transmission apparatuses 30-1, 30-2, and 30-3, and transmission apparatuses 40-1, 40-2, and 40-3. Note that hereinafter, the transmission apparatuses 30-1, 30-2, and 30-3 may be collectively, simply referred to as the transmission apparatus 30. Further, the transmission apparatuses 40-1, 40-2, and 40-3 may be collectively, simply referred to as the transmission apparatus 40. Further, for simplifying the description, the number of transmission apparatuses 30 and the number of transmission apparatuses 40 are both three in this example embodiment. However, these numbers are not limited respectively to three, and may each be four or more.

In FIG. 1, the communication apparatus 10 is connected to the transmission apparatuses 30-1, 30-2, and 30-3 through links L1, L2, and L3, respectively.

Then, the transmission apparatuses 30-1, 30-2, and 30-3 are connected to the transmission apparatuses 40-1, 40-2, and 40-3 through wireless sections W1, W2, and W3, respectively. Then, the transmission apparatuses 40-1, 40-2, and 40-3 are connected to the communication apparatus 20 through links L4, L5, and L6, respectively. For example, the link L1, the wireless section W1, and the link L4 configure a "first communication path". Further, the link L2, the wireless section W2, and the link L5 configure a "second communication path". Further, the link L3, the wireless section W3, and the link L6 configure a "third communication path".

Then, the communication apparatus 10 performs multilink communication with the communication apparatus 20 simultaneously using the first communication path, the second communication path, and the third communication path. That is, the multilink communication is communication using a plurality of communication paths as one virtual communication line. Hereinafter, the communication apparatus 10 may be referred to as a "transmitting-side communication apparatus", and the communication apparatus 20 may be referred to as a "communication partner apparatus" of the communication apparatus 10.

Further, the communication apparatus 10 sets one or a plurality of flows for each of the first, the second, and the third communication paths. Then, when the communication apparatus 10 receives a transmission frame transmitted from a certain transmission source terminal (not shown), it sends the received transmission frame toward the communication path in which a flow corresponding to the received transmission frame is set.

Note that for example, the communication apparatus 10 may reset (i.e., distribute again) the setting flow for the first communication path to a communication path other than the first communication path, that is, the second or the third communication paths. In this case, the communication apparatus 10 defines the second and the third communication paths other than the first communication path as a plurality of "candidate communication paths", and determines a "distribution-destination communication path" from among the plurality of candidate communication paths based on "free bandwidths" of the respective candidate communication paths. Then, the communication apparatus 10 distributes the setting flow for the first communication path to the determined distribution-destination communication path. By doing so, the flow can be distributed to a suitable communication path.

<Configuration Example of Transmitting-Side Communication Apparatus>

Figure 2:
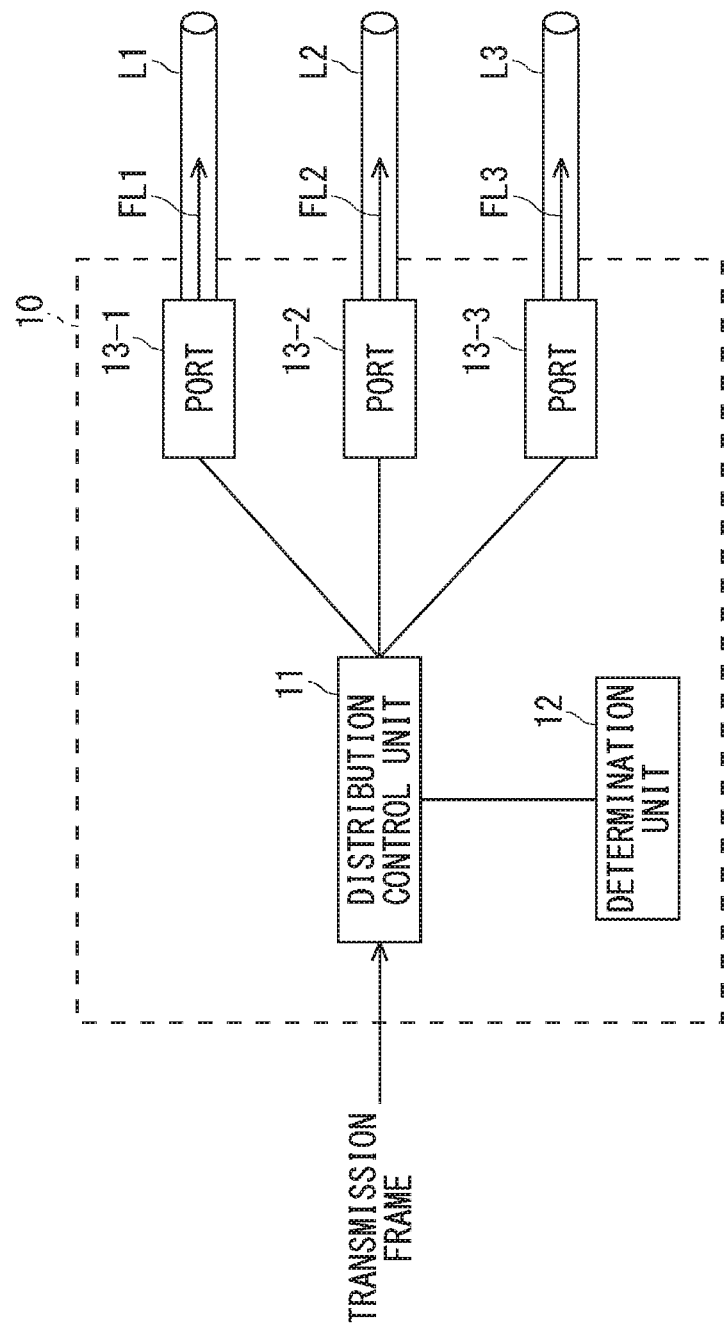
FIG. 2 is a block diagram showing an example of a transmitting-side communication apparatus according to the first example embodiment.

FIG. 2 is a block diagram showing an example of a transmitting-side communication apparatus according to the first example embodiment. In FIG. 2, the communication apparatus 10, which is a transmitting-side communication apparatus, includes a distribution control unit 11, a determination unit 12, and ports 13-1, 13-2, and 13-3. The ports 13-1, 13-2, and 13-3 correspond to the first, the second, and the third communication paths, respectively. Hereinafter, the ports 13-1, 13-2, and 13-3 may be collectively, simply referred to as the port 13.

The distribution control unit 11 associates each of a plurality of flows with one of the first, the second, and the third communication paths. That is, one or a plurality of flows are set for each of the first, the second, and the third communication paths.

Further, the distribution control unit 11 executes control for distributing the setting flow for one of the first, the second, and the third communication paths to a distribution-destination communication path different from the one communication path. For example, the distribution control unit 11 executes control for distributing the setting flow for the aforementioned one communication path to the distribution-destination communication path (i.e., control for resetting the setting flow in the distribution-destination communication path) based on the "free bandwidth" of the aforementioned one communication path. Hereinafter, this control may be referred to as "redistribution control".

Then, when the distribution control unit 11 receives a transmission frame transmitted from a certain transmission source terminal (not shown), it sends the received transmission frame toward the port 13 in which a flow corresponding to the received transmission frame is set.

When the distribution control unit 11 executes redistribution control, the determination unit 12 determines a "distribution-destination communication path" from a plurality of candidate communication paths other than the aforementioned one communication path of the first, the second, and the third communication paths based on the "free bandwidths" of the respective candidate communication paths.

Each of the ports 13-1, 13-2, and 13-3 transmits the transmission frame received from the distribution control unit 11 to the corresponding link (i.e., communication paths).

According to the first example embodiment as described above, in the communication apparatus 10, the determination unit 12 determines a "distribution-destination communication path" from a plurality of candidate communication paths other than one communication path of a plurality of communication paths used for multilink communication based on the "free bandwidths" of the respective candidate communication paths. Then, the distribution control unit 11 executes control for distributing the setting flow for the aforementioned one communication path to the determined distribution-destination communication path.

The configuration of the communication apparatus 10 enables a distribution-destination communication path to be determined based on the free bandwidth of each of a plurality of candidate communication paths, thereby distributing a flow to a suitable communication path.

Second Example Embodiment

The second example embodiment relates to a more specific example embodiment. Note that the basic configuration of a communication system according to the second example embodiment is the same as that of the communication system 1 according to the first example embodiment, and thus will be described with reference to FIG. 1.

<Outline of Communication System>

In the communication system 1 according to the second example embodiment, the communication apparatus 10 is included in a first network. Further, the communication apparatus 20 is included in a second network. Further, the transmission apparatuses 30-1, 30-2, and 30-3 and the transmission apparatuses 40-1, 40-2, and 40-3 are included in a third network. For example, the first and the second networks are Ethernet (registered trademark) networks, and the third network is a wireless network. Further, for example, the first and the second networks may be Ethernet (registered trademark) networks, and the third network may be a wired network. Further, for example, the transmission apparatus 30-1 and the transmission apparatus 40-1 may be included in the wireless network, and the transmission apparatuses 30-2 and 30-3 and the transmission apparatuses 40-2 and 40-3 may be included in the wired network. That is, both the wireless and the wired networks may be used for the third network. In short, the first, the second, and the third networks are not limited to particular types of networks.

Figure 3:
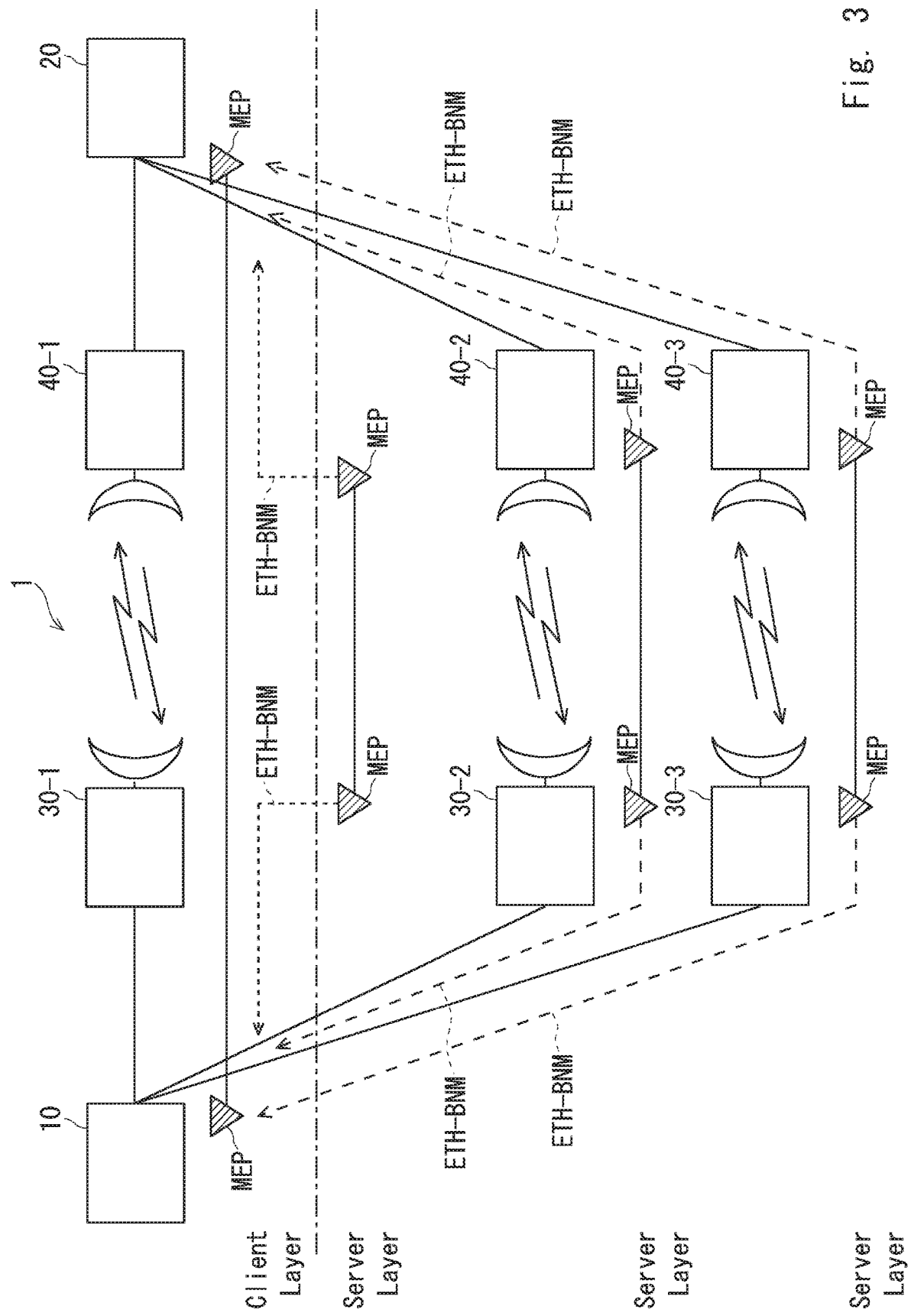
FIG. 3 is a diagram for explaining a communication system according to a second example embodiment.

Then, a partial communication section in the communication path between the first and the second networks is supported by the third network. That is, as shown in FIG. 3, the first and the second networks are "client layers" when the third network is used as a reference, and on the other hand, the third network is a "server layer" when the first and the second networks are used as references. FIG. 3 is a diagram for explaining the communication system according to the second example embodiment.

Then, as shown in FIG. 3, both of the communication apparatuses 10 and 20 are Maintenance End Points (MEPs) of Operations, Administration, and Maintenance (OAM) of the client layers. Further, both of the transmission apparatuses 30 and 40 are MEPs of OAM of the server layers.

Then, the server layer has a function of notifying the client layer of a band notification message (e.g., Ethernet (registered trademark) band notification message: ETH-BNM). For example, the transmission apparatus 30 transmits, to the communication apparatus 10, a band notification message including information about a "current available bandwidth" for the communication section where the transmission apparatus 30 is located. Further, the transmission apparatus 40 transmits, to the communication apparatus 20, a band notification message including information about a "current available bandwidth" for the communication section where the transmission apparatus 40 is located. That is, the transmission apparatuses 30 and 40 are also MEPs of the band notifications.

Then, the communication apparatus 10 calculates a free bandwidth of each of the communication paths used for multilink communication based on the current available bandwidth transmitted from each of the transmission apparatuses 30. Then, the communication apparatus 10 determines, from a plurality of candidate communication paths other than one of a plurality of communication paths used for multilink communication, a distribution-destination communication path based on the free bandwidths of the respective candidate communication paths. Then, the communication apparatus 10 executes control for distributing a setting flow for the one communication path to the determined distribution-destination communication path.

<Configuration Example of Transmitting-Side Communication Apparatus>

Figure 4:
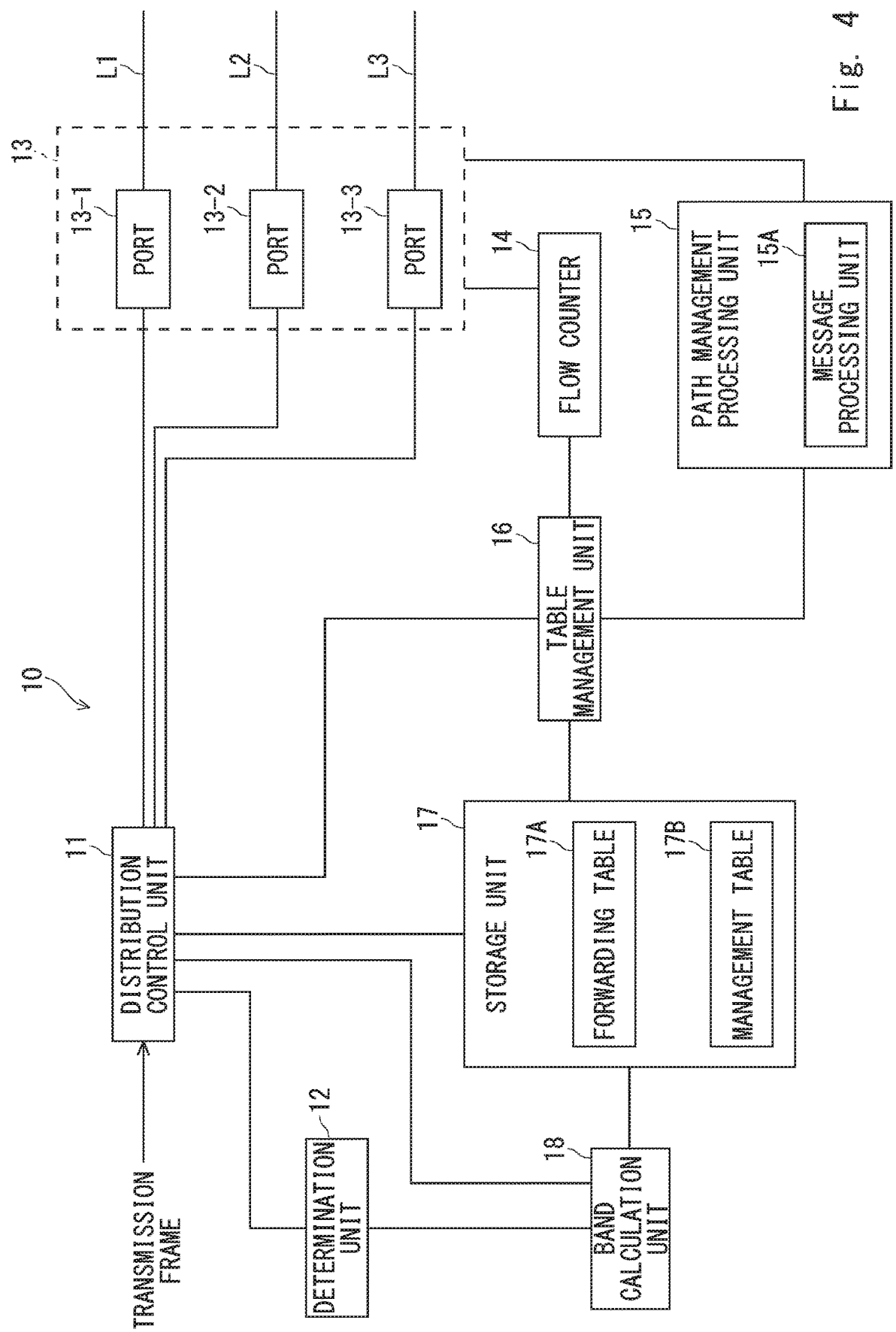
FIG. 4 is a block diagram showing an example of a transmitting-side communication apparatus according to the second example embodiment.

FIG. 4 is a block diagram showing an example of a transmitting-side communication apparatus according to the second example embodiment. In FIG. 4, the communication apparatus 10, which is a transmitting-side communication apparatus according to the second example embodiment, includes a distribution control unit 11, a determination unit 12, a port 13, a flow counter 14, a path management processing unit 15, and a table management unit 16, a storage unit 17, and a band calculation unit 18.

The flow counter 14 acquires throughputs (i.e., usage bandwidths) for the respective flows set in the ports 13 (i.e., communication paths), and outputs the acquired usage bandwidths for the respective flows to the table management unit 16.

The path management processing unit 15 receives a band notification message transmitted from the transmission apparatus 30 through the port 13, and extracts information about the current available bandwidth from the received band notification message. The path management processing unit 15 has a message processing unit 15A, and the processing for extracting the information is performed by the message processing unit 15A. Note that the path management processing unit 15 is, for example, a function unit corresponding to ETH-OAM of ITU-T G.8013/Y.1731, and the message processing unit 15A is a function unit corresponding to ETH-BN of ITU-T G.8013/Y.1731.

The table management unit 16 updates a "forwarding table" and a "management table" stored in the storage unit 17 using the information received from each of the flow counter 14, the path management processing unit 15, and the distribution control unit 11.

The storage unit 17 stores a forwarding table 17A and a management table 17B. FIG. 5 shows an example of the forwarding table according to the second example embodiment. FIG. 6 shows an example of the management table according to the second example embodiment.

As shown in FIG. 5, the forwarding table 17A associates, for each entry, a flow number with a MAC address of the flow destination terminal (not shown), a VLAN (Virtual LAN) identifier (VLAN ID), and an identifier of a transfer destination port (Transmit Port). The transfer-destination port identifiers A, B, and C in FIG. 5 correspond to, for example, the ports 13-1, 13-2, and 13-3, respectively.

As shown in FIG. 6, the management table 17B associates, for each of the port identifiers, a nominal bandwidth (Nominal Bandwidth) with a current available bandwidth (Bandwidth), a free bandwidth (Free Bandwidth), VLAN identifiers assigned to the respective ports, and usage bandwidths (Throughput) corresponding to the respective VLAN identifiers. Each of the VLAN identifiers assigned to the respective ports corresponds to one flow. For example, in FIG. 6, the nominal bandwidth (i.e., the maximum bandwidth) of a port A is 100 Mbps, the current available bandwidth thereof is 50 Mbps, and the free bandwidth thereof is 0 Mbps. Further, at the port A, the usage bandwidth of the flow corresponding to the VLAN identifier 100 is 10 Mbps, the usage bandwidth of the flow corresponding to the VLAN identifier 200 is 20 Mbps, and the usage bandwidth of the flow corresponding to the VLAN identifier 300 is 30 Mbps. Meanwhile, the usage bandwidths of the flows corresponding to the VLAN identifiers 400, 500, and 600, respectively, at the port A are zero. That is, the usage bandwidth of the entire flow of the port A is 60 Mbps. Note that the current available bandwidth of the port A is 50 Mbps in FIG. 6 and is smaller than the usage bandwidth (60 Mbps) of the entire flow of the port A, and accordingly the free bandwidth of the port A is zero.

Returning to the description of FIG. 4, the band calculation unit 18 calculates a free bandwidth of the communication path corresponding to each of the ports 13 by referring to the management table stored in the storage unit 17. Specifically, the band calculation unit 18 calculates, for a port of interest of the ports 13-1, 13-2, and 13-3 used for multilink communication, the sum of the usage bandwidths of a plurality of flows associated with the port of interest with reference to the management table 17B. Then, the band calculation unit 18 reads the current available bandwidth of the port of interest from the management table 17B. Then, the band calculation unit 18 calculates a free bandwidth of the port of interest by subtracting the sum of the usage bandwidths calculated for the port of interest from the read current available bandwidth of the port of interest. Then, the bandwidth calculation unit 18 sequentially changes a port of interest among the ports 13-1, 13-2, and 13-3, and calculates a free bandwidth for each of the ports 13-1, 13-2, and 13-3. Then, the band calculation unit 18 outputs the calculated free bandwidths of the communication paths corresponding to the respective ports 13 to the distribution control unit 11.

The distribution control unit 11 associates one of the first, the second, and the third communication paths with each of the plurality of flows. For example, when the distribution control unit 11 receives a transmission frame, it determines whether a transfer destination port of a flow corresponding to the transmission frame has been defined in the forwarding table. If such a port has not been defined, the distribution control unit 11 sets a transfer destination port of a flow corresponding to the transmission frame using a hash function or the like. Information about the transfer destination port set in that flow is output to the table management unit 16, and is reflected in the forwarding table by the table management unit 16. Meanwhile, if such a port has been defined, the distribution control unit 11 sends the transmission frame to the transfer destination port associated with that flow of the transmission frame according to the definition.

Further, the distribution control unit 11 executes "redistribution control" in which the flow associated with one port 13 (i.e., a communication path) having the free bandwidth, which is calculated by the band calculation unit 18, of equal to or less than a predetermined level is distributed to another port 13 (i.e., a distribution-destination communication path) different from the one port 13. At this time, for example, the distribution control unit 11 sequentially selects, as a "flow to be determined", a flow having the highest priority from among a plurality of flows associated with the one port 13 having the free bandwidth of equal to or less than a predetermined level. The priority becomes higher, for example, as the usage bandwidth becomes larger. Further, in contrast to this, the priority can become higher as the free bandwidth becomes smaller. Then, when the usage bandwidth of the flow to be determined is equal to or less than the free bandwidth of the distribution-destination communication path, the distribution control unit 11 determines to distribute the flow to be determined to the distribution-destination communication path. On the other hand, when the usage bandwidth of the flow to be determined is larger than the free bandwidth of the distribution-destination communication path, the flow having the second highest priority is determined as a flow to be determined in accordance with the aforementioned priority.

When the distribution control unit 11 executes the redistribution control, the determination unit 12 determines, from a plurality of ports 13 (i.e., a plurality of candidate communication paths) which are distribution destination candidates other than the aforementioned one port 13, the aforementioned distribution-destination communication path based on the free bandwidths of the respective candidate communication paths. For example, the determination unit 12 determines, based on the free bandwidths of the respective candidate communication paths, a candidate communication path having a high priority among the plurality of candidate communication paths as the distribution-destination communication path. The priority becomes higher, for example, as the free bandwidth becomes larger. That is, in accordance with this priority, a candidate communication path having the largest free bandwidth among a plurality of candidate communication paths is selected as the distribution-destination communication path. Further, in contrast to this, the priority can become higher as the free bandwidth becomes smaller. Then, information about the distribution-destination communication path determined by the determination unit 12 is output to the distribution control unit 11. Then, the information is sent to the table management unit 16 through the distribution control unit 11, and is reflected in the forwarding table by the table management unit 16.

<Configuration Example of Transmission Apparatus>

Figure 7:
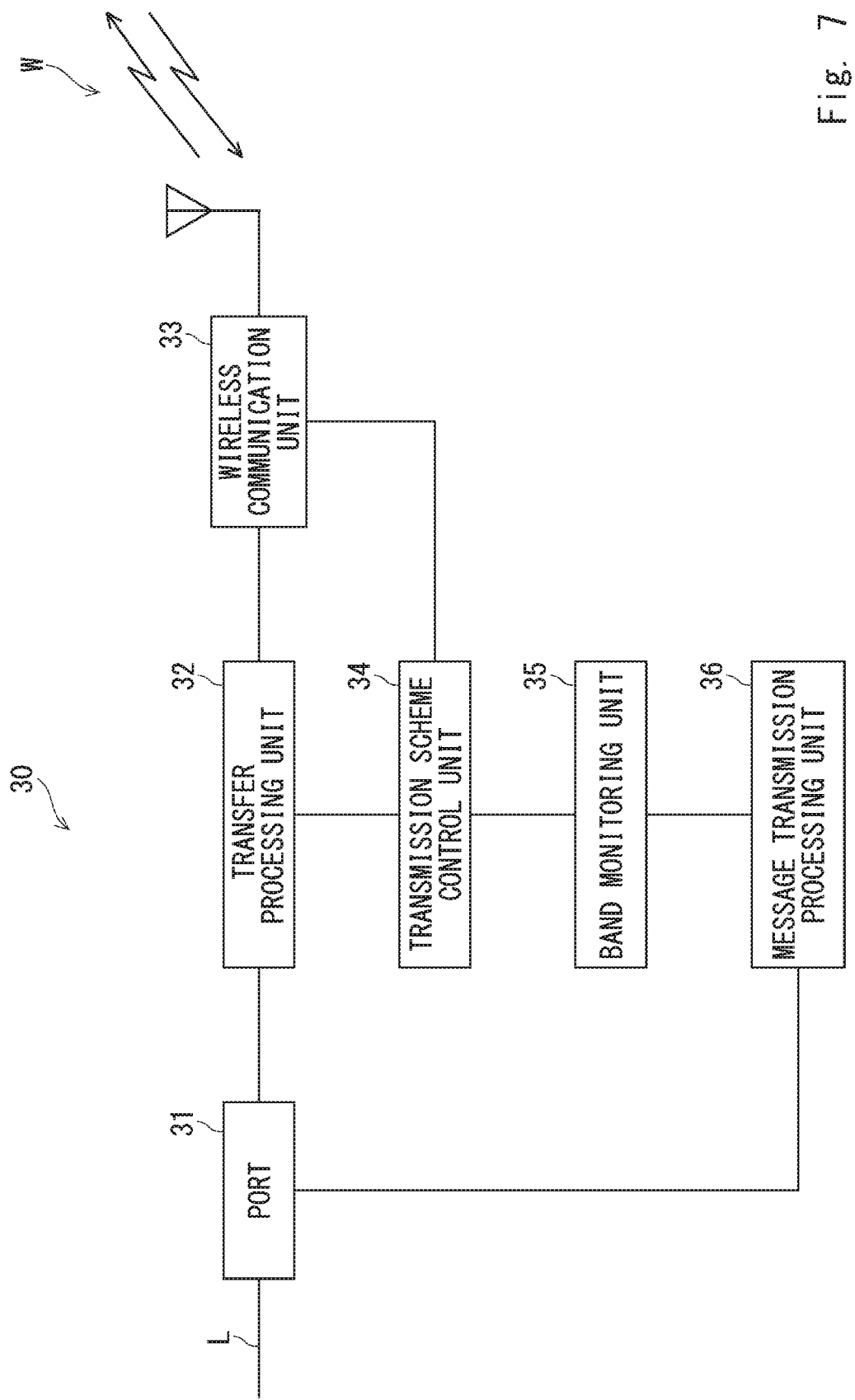
FIG. 7 shows an example of a transmission apparatus according to the second example embodiment.

FIG. 7 shows an example of the transmission apparatus according to the second example embodiment. In FIG. 7, the transmission apparatus 30 includes a port 31, a transfer processing unit 32, a wireless communication unit 33, a transmission scheme control unit 34, a band monitoring unit 35, and a message transmission processing unit 36.

The port 31 is an interface to the link L between the transmission apparatus 30 and the communication apparatus 10. For example, the port 31 receives a transmission frame through the link L, and outputs the transmission frame to the transfer processing unit 32. Further, the port 31 transmits a band notification message received from the message transmission processing unit 36 to the communication apparatus 10 through the link L.

The transfer processing unit 32 performs transfer processing on the transmission frame received from the port 31, and outputs the transmission frame on which the transfer processing has been performed to the wireless communication unit 33. For example, the transfer processing unit 32 performs, as the transfer processing, transmission processing (e.g., modulation processing according to the modulation scheme) corresponding to the transmission scheme determined by the transmission scheme control unit 34 on the transmission frame. That is, for example, adaptive modulation is performed by the transfer processing unit 32.

The wireless communication unit 33 performs wireless transmission processing on the transmission frame received from the transfer processing unit 32, and transmits a wireless signal obtained by the wireless transmission processing to the transmission apparatus 40 through the wireless section W. Further, the wireless communication unit 33 receives the signal transmitted from the transmission apparatus 40, and performs wireless reception processing on the received signal. Then, the wireless communication unit 33 outputs the signal on which the wireless reception processing has been performed to the transmission scheme control unit 34.

The transmission scheme control unit 34 extracts communication quality information from the signal received from the wireless communication unit 33, and determines a transmission scheme (e.g., modulation scheme) based on the extracted communication quality information. Then, the transmission scheme control unit 34 outputs information indicating the determined transmission scheme to the transfer processing unit 32.

The band monitoring unit 35 calculates a bandwidth corresponding to the transmission scheme determined by the transmission scheme control unit 34 to be a "current available bandwidth". For example, bad weather or the like may cause the communication quality of the wireless section W to deteriorate. When the communication quality deteriorates, the transmission scheme control unit 34 selects, for example, a low-order modulation scheme. Consequently, the current available bandwidth is reduced in the wireless section W. Note that the band monitoring unit 35 corresponds to the aforementioned MEP of the server layer.

The message transmission processing unit 36 generates a band notification message including the information about the current available bandwidth calculated by the band monitoring unit 35, and outputs the generated band notification message to the port 31. The message transmission processing unit 36 is, for example, a function unit corresponding to ETH-BN of ITU-T G.8013/Y.1731.

<Operation Example of Communication System>

The processing operation of the communication system according to the second example embodiment having the above-described configuration is described. In particular, the processing operation of the communication apparatus 10 is described here.

Figure 8:
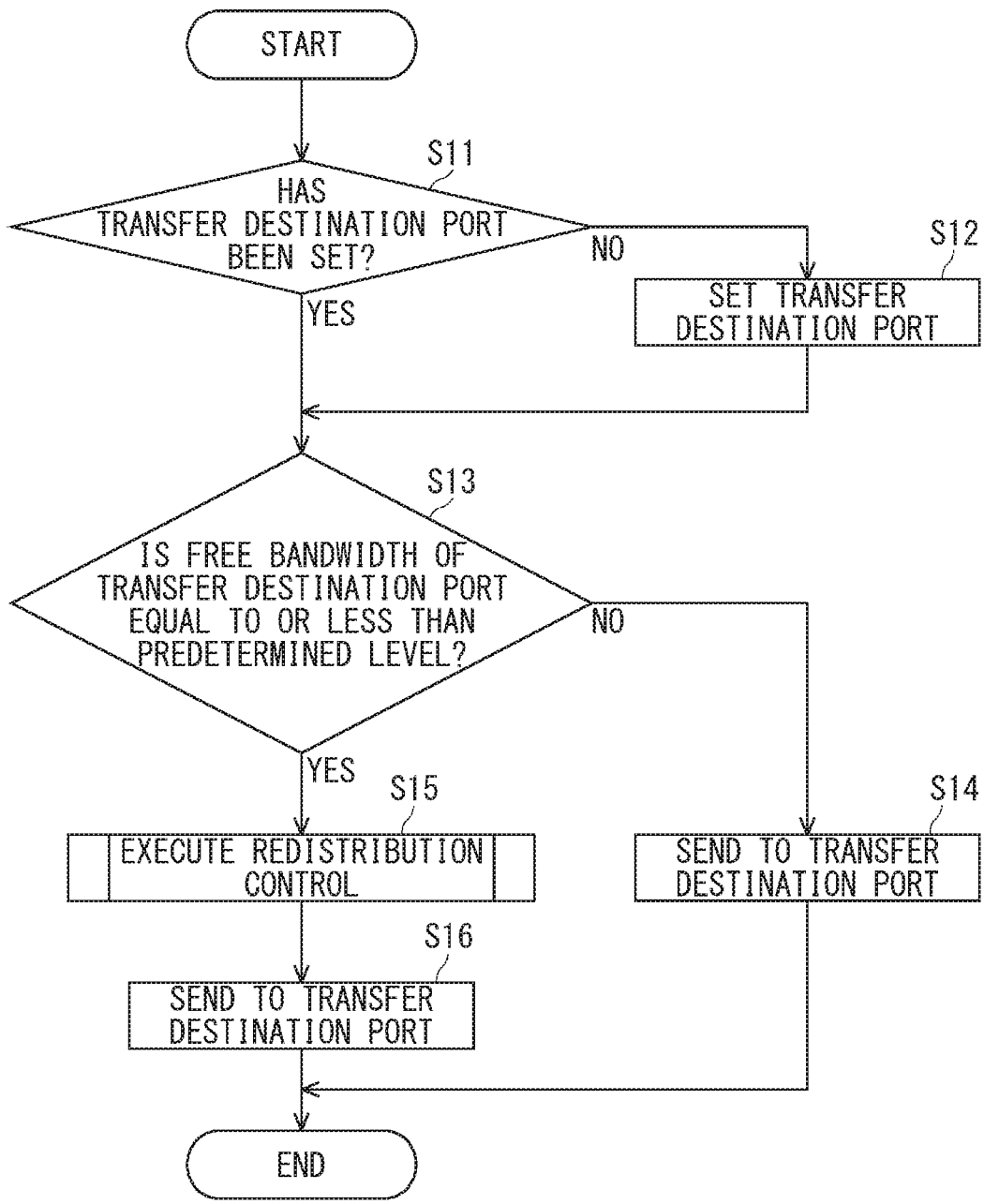
FIG. 8 is a flowchart showing an example of a processing operation of the transmitting-side communication apparatus according to the second example embodiment.

FIG. 8 is a flowchart showing an example of the processing operation of the transmitting-side communication apparatus according to the second example embodiment. The processing flow shown in FIG. 8 starts when the communication apparatus 10 receives a transmission frame.

When the distribution control unit 11 receives a transmission frame, it determines whether a transfer destination port corresponding to the transmission frame has already been set in the forwarding table (Step S11). For example, the distribution control unit 11 determines whether there is an entry corresponding to the combination of the destination MAC address and the VLAN identifier included in the header part of the transmission frame in the forwarding table 17A.

When a transfer destination port corresponding to the transmission frame has not yet been set in the forwarding table (NO in Step S11), the distribution control unit 11 sets a transfer destination port of the flow corresponding to the transmission frame (Step S12). For example, the distribution control unit 11 determines a transfer destination port by using the MAC address of the transmission frame and a hash function. The identifier of the determined transfer destination port, and the destination MAC address and the VLAN identifier included in the header part of the transmission frame are output to the table management unit 16, and are reflected in the forwarding table 17A by the table management unit 16. Then, the processing step proceeds to Step S13.

When a transfer destination port corresponding to the transmission frame has already been set in the forwarding table (YES in Step S11), the processing step proceeds to Step S13.

Next, the distribution control unit 11 determines whether a free bandwidth of the transfer destination port corresponding to the received transmission frame is equal to or less than a predetermined level (Step S13). That "a free bandwidth is equal to or less than a predetermined level" means, for example, that a free bandwidth is less than or equal to zero, and in this case, it means that there is no free bandwidth.

When a free bandwidth of the transfer destination port is larger than the predetermined level (NO in Step S13), the distribution control unit 11 sends the transmission frame to the transfer-destination port corresponding to that transmission frame (Step S14). For example, when the transmission frame corresponding to the flow No. 5 in FIG. 5 is received, the free bandwidth of the transfer destination port B corresponding to the flow No. 5 is not zero, and accordingly the distribution control unit 11 sends the transmission flow to the port 13-2 of the transfer-destination port identifier B.

When a free bandwidth of the transfer destination port is less than or equal to the predetermined level (YES in Step S13), the distribution control unit 11 executes "redistribution control" (Step S15). For example, when the transmission frame corresponding to the flow No. 1 in FIG. 5 is received, the free bandwidth of transfer destination port A corresponding to the flow No. 1 is zero, and accordingly the distribution control unit 11 executes "redistribution control".

Figure 9:
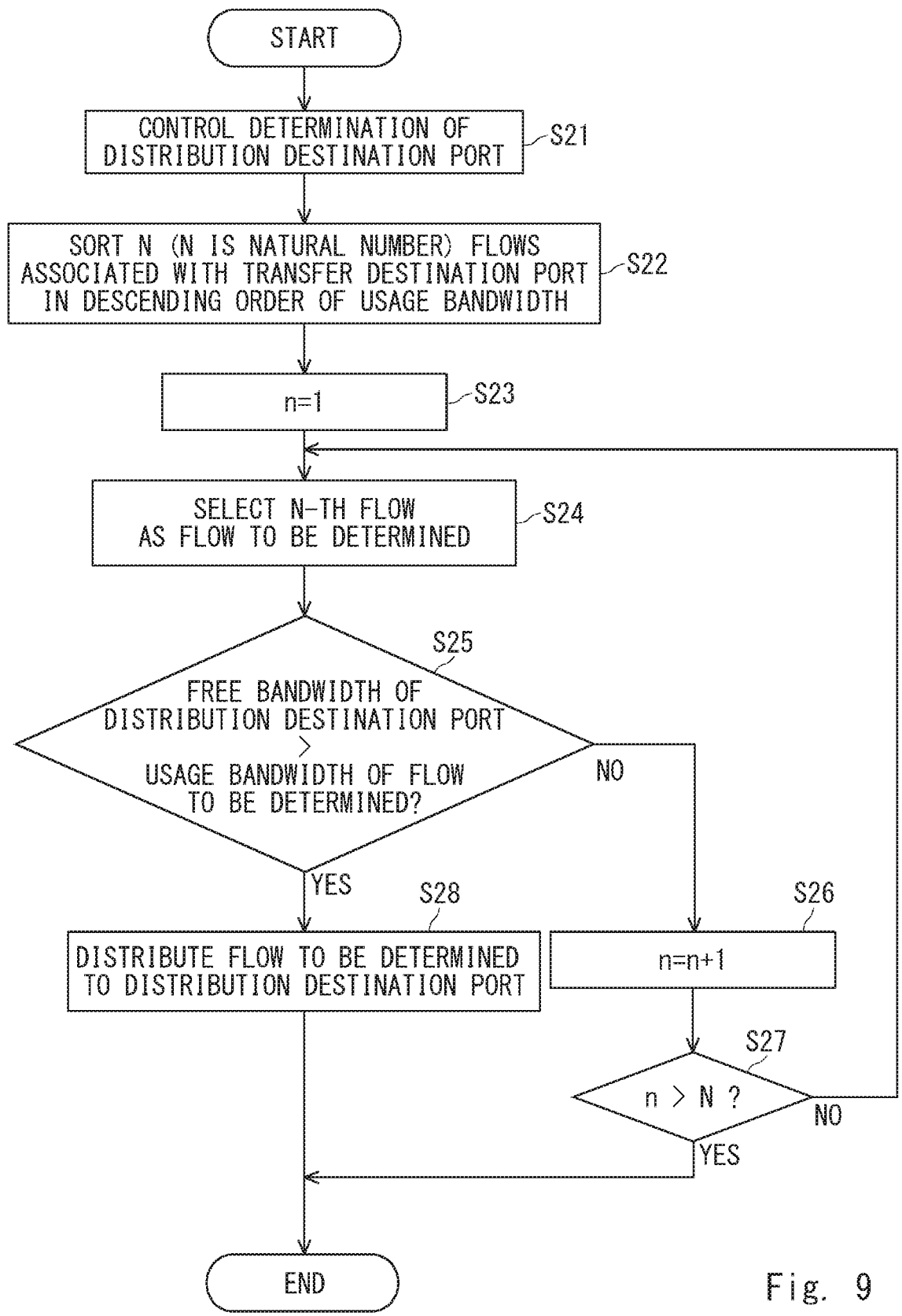
FIG. 9 is a flowchart showing an example of a redistribution control of the transmitting-side communication apparatus according to the second example embodiment.

FIG. 9 is a flowchart showing an example of the redistribution control of the transmitting-side communication apparatus according to the second example embodiment.

The distribution control unit 11 controls a determination of a distribution destination port (Step S21). Specifically, the distribution control unit 11 causes the determination unit 12 to determine a distribution destination port from a plurality of ports 13 which are distribution destination candidates other than the one port 13 having the free bandwidth of equal to or less than a predetermined level based on the free bandwidths of the respective distribution destination candidates. For example, the determination unit 12 determines a distribution destination candidate having the largest free bandwidth among the plurality of distribution destination candidates as a distribution destination port. For example, when the transmission frame corresponding to the flow No. 1 in FIG. 5 is received, the free bandwidth of the transfer destination port A corresponding to the flow No. 1 in FIG. 6 is zero, and accordingly the port identifier C having the bandwidth larger than that of the port identifier B is selected as a distribution destination port.

Next, the distribution control unit 11 sorts N (N is a natural number) flows associated with the transfer destination port having the free bandwidth of equal to or less than a predetermined level in a descending order of the usage bandwidth (Step S22). Note that it is assumed here that the aforementioned priority becomes "higher as the usage bandwidth becomes larger", and thus N flows are sorted in a descending order of the usage bandwidth. However, in the case where the aforementioned priority becomes "higher as the free bandwidth becomes smaller", N flows are instead sorted in an ascending order of the usage bandwidth.

Next, the distribution control unit 11 sets n=1 (Step S23), and selects the n(=1)-th flow as a flow to be determined (Step S24).

Next, the distribution control unit 11 determines whether the free bandwidth of the distribution destination port is larger than the usage bandwidth of the flow to be determined (Step S25).

When the free bandwidth of the distribution destination port is equal to or less than the usage bandwidth of the flow to be determined (Step S25), the distribution control unit 11 increments the value of n (Step S26), and determines whether n is larger than N, that is, whether there is a flow that is not selected as a flow to be determined (Step S27).

When there is a flow that is not selected as a flow to be determined (NO in Step S27), the processing step returns to Step S24. That is, the flow having the second largest usage bandwidth is selected as a flow to be determined. On the other hand, when all the flows associated with the transfer destination ports having the free bandwidths of equal to or less than a predetermined level have been selected as flows to be determined (YES in Step S27), the redistribution control is terminated, and then the processing step proceeds to Step S16.

When the free bandwidth of the distribution destination port is larger than the usage bandwidth of the flow to be determined (YES in Step S25), the distribution control unit 11 distributes the flow to be determined to the distribution destination port (Step S28). Then, the redistribution control is terminated, and the processing step proceeds to Step S16.

Note that in the aforementioned Steps S22 to S28, for example, the following redistribution control is performed for the flows associated with the transfer destination port A in FIGS. 5 and 6. First, when the flows associated with the transfer destination port A are sorted in Step S22, the flow of the VLAN identifier 300, the flow of the VLAN identifier 200, and the flow of the VLAN identifier 100 are ranked in this order. Then, in Steps S23 and S24, the flow of the VLAN identifier 300 is selected as a flow to be determined. Then, in Step S25, it is determined that the free bandwidth (100 Mbps in FIG. 6) of the port of the port identifier C, which is the distribution destination port, is larger than the usage bandwidth (30 Mbps in FIG. 6) of the flow of VLAN identifier 300. Then, in Step S28, the VLAN identifier 300 is distributed to the port of the port identifier C. As a result, the table management unit 16 rewrites the transfer-destination port identifier of the flow of the VLAN identifier 300 in the forwarding table 17A shown in FIG. 10 to the identifier C, and rewrites the usage bandwidth of the VLAN identifier 300 corresponding to the port identifier C in the management table 17B shown in FIG. 11 to 30 Mbps. FIG. 10 is a diagram for explaining rewriting of the forwarding table. FIG. 11 is a diagram for explaining rewriting of the management table.

Returning to the description of FIG. 8, the distribution control unit 11 sends the transmission frame to the redistributed transfer destination port (Step S16).

According to the second example embodiment as described above, in the communication apparatus 10, the determination unit 12 determines a distribution destination port (i.e., a distribution-destination communication path) from a plurality of ports 13 (i.e., a plurality of candidate communication paths) which are distribution destination candidates other than one port 13 based on the free bandwidths of the respective distribution destination candidates. Specifically, the determination unit 12 determines, a candidate communication path having a high priority among a plurality of candidate communication paths based on the free bandwidth of the respective candidate communication paths. The priority becomes higher as the free bandwidth becomes larger.

The configuration of the communication apparatus 10 enables a candidate communication path having a large free bandwidth to be determined as a distribution-destination communication path, thereby distributing a flow to a suitable communication path.

Further, in the communication apparatus 10, the distribution control unit 11 executes control for distributing the setting flow set to one port 13 of a plurality of ports 13 (i.e., a plurality of communication paths) used for multilink communication to a distribution destination port other than the one port 13 based on the free bandwidth of the one port 13. Specifically, the distribution control unit 11 distributes the setting flow to a distribution destination port when the free bandwidth of the aforementioned one port 13 is equal to or less than a predetermined level.

The configuration of the communication apparatus 10 can prevent transmission capacity of multilink communication from being reduced due to congestion of the communication path corresponding to the one port 13.

Further, in the communication apparatus 10, the distribution control unit 11 determines to distribute the flow to be determined to the distribution destination port when the usage bandwidth of the flow to be determined of a plurality of flows set to the one port 13 is smaller than the free bandwidth of the distribution destination port.

The configuration of the communication apparatus 10 can prevent transmission capacity of multilink communication from being reduced due to congestion of the communication path corresponding to the one port 13 as a result of distributing the flow.

<Modified Example>

The following modification can be applied to the communication apparatus 10 according to the second embodiment. FIGS. 12 and 13 show an example of the forwarding table according to a <Modified example> of the second example embodiment.

The items of the forwarding tables shown in FIGS. 12 and 13 are the same as those of the forwarding table shown in FIG. 5 other than a change flag (Change Flag) and an identifier of the transfer destination port that has been changed (Changed Transmit Port). For example, when the flow of flow No. 3 in FIG. 12 is distributed from the port of the port identifier A to the port of the port identifier C, the table management unit 16 sets, as shown in FIG. 13, the change flag in the ON state with the value of the item "transfer destination port" remaining as A, and inputs C as a value of the item "changed transfer-destination port identifier". That is, in the forwarding tables shown in FIGS. 12 and 13, the change flag indicates the presence or absence of redistribution, and the transfer-destination port identifier that has been changed is input in the item "changed transfer-destination port identifier" and the transfer-destination port identifier that has not yet been changed is input in the item "transfer destination port".

By using the above-described forwarding tables, the distribution control unit 11 simply causes the table management 16 to set the change flag of the forwarding table in the OFF state, and thus it can easily reset the transfer port to the original transfer destination port when, for example, the current available bandwidth of the communication path corresponding to the transfer destination port that has not yet been changed increases due to an improvement in weather or the like.

Other Example Embodiments

Figure 14:
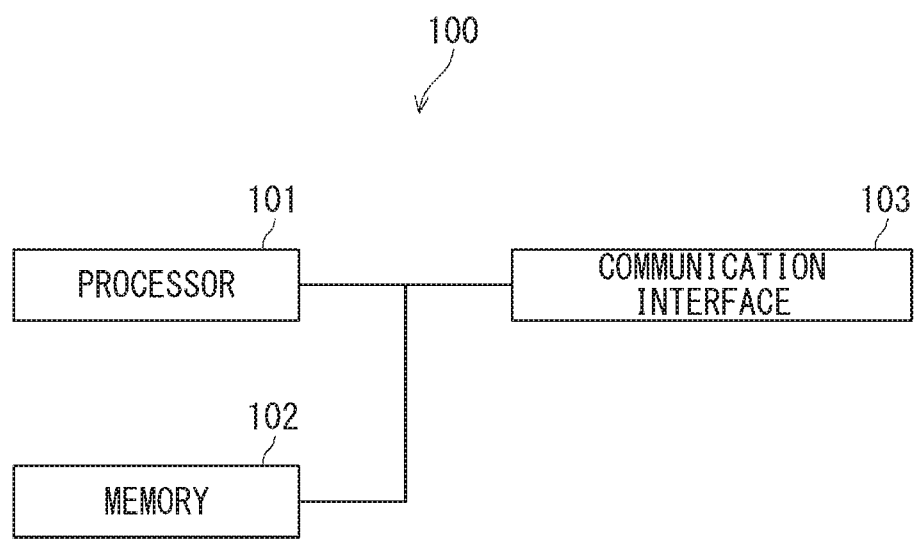
FIG. 14 shows an example of a hardware configuration of the communication apparatus.

The communication apparatus 10 according to the first and second example embodiments may have the following hardware configuration. FIG. 14 shows an example of the hardware configuration of the communication apparatus.

In FIG. 14, the communication apparatus 10 includes a processor 101, a memory 102, and a communication interface 103.

The distribution control unit 11, the determination unit 12, the flow counter 14, the path management processing unit 15, the table management unit 16, and the band calculation unit 18 according to the communication apparatus 10 that has been described in the first and second example embodiments are implemented by the processor 101 loading and executing a program stored in the memory 102. Further, the storage unit 17 of the communication apparatus 10 that has been described in the first and the second example embodiments is implemented by the memory 102. Further, the port 13 of the communication apparatus 10 that has been described in the first and second example embodiments is implemented by the communication interface 103.

While the present invention has been described with reference to the example embodiments, the present invention is not limited to the aforementioned example embodiments. Various changes that can be understood by those skilled in the art can be made to the configurations and the details of the present invention within the scope of the present invention.

For example, the whole or part of the example embodiments disclosed above can be described as, but not limited to, the following supplementary notes.

(Supplementary note 1)

A communication apparatus configured to perform multilink communication simultaneously using a plurality of communication paths, in which one or a plurality of flows are set for each communication path, with a communication partner apparatus, the communication apparatus comprising:

a distribution control unit configured to execute control for distributing a setting flow for a first communication path of a plurality of communication paths to a distribution-destination communication path different from the first communication path; and a determination unit configured to determine the distribution-destination communication path from a plurality of candidate communication paths other than the first communication path included in the plurality of communication paths based on free bandwidths of the respective candidate communication paths.

(Supplementary note 2)

The communication apparatus described in Supplementary note 1, wherein the determination unit selects a candidate communication path having the largest free bandwidth among a plurality of candidate communication paths as a distribution-destination communication path.

(Supplementary note 3)

The communication apparatus described in Supplementary note 1 or 2, wherein the distribution control unit executes control for distributing the setting flow to the distribution-destination communication path based on the free bandwidth of the first communication path.

(Supplementary note 4)

The communication apparatus described in Supplementary note 3, wherein the distribution control unit distributes the setting flow to the distribution-destination communication path when the free bandwidth of the first communication path is equal to or less than a predetermined level.

(Supplementary note 5)

The communication apparatus described in Supplementary note 3 or 4, wherein the distribution control unit determines, based on a usage bandwidth of a flow to be determined of a plurality of flows set to the first communication path and the free bandwidth of the distribution-destination communication path, whether to distribute the flow to be determined to the distribution-destination communication path.

(Supplementary note 6)

The communication apparatus described in Supplementary note 5, wherein when the usage bandwidth of the flow to be determined is equal to or less than the free bandwidth of the distribution-destination communication path, the distribution control unit determines to distribute the flow to be determined to the distribution-destination communication path.

(Supplementary note 7)

The communication apparatus described in Supplementary note 5 or 6, wherein the distribution control unit sequentially selects, as the flow to be determined, a flow having a highest priority from among the plurality of flows set to the first communication path.

(Supplementary note 8)

The communication apparatus described in Supplementary note 7, wherein the priority becomes higher as the usage bandwidth becomes larger.

(Supplementary note 9)

The communication apparatus described in Supplementary note 7, wherein the priority becomes higher as the usage bandwidth becomes smaller.

(Supplementary note 10)

The communication apparatus described in any one of Supplementary notes 1 to 9, further comprising an acquisition unit configured to acquire, from a transmission apparatus located in a communication section included in the first communication path, information about a current available bandwidth for the communication section, wherein the distribution control unit calculates the free bandwidth of the first communication path by subtracting a sum of the usage bandwidths of the plurality of flows set to the first communication path from the current available bandwidth.

(Supplementary note 11)

The communication apparatus described in any one of Supplementary notes 1 to 10, further comprising a plurality of communication ports corresponding to the plurality of respective communication paths.

(Supplementary note 12)

The communication apparatus described in any one of Supplementary notes 1 to 11, wherein the plurality of flows are associated with a VLAN identifier.

(Supplementary note 13)

A communication control method executed by a communication apparatus configured to perform multilink communication simultaneously using a plurality of communication paths, in which one or a plurality of flows are set for each communication path, with a communication partner apparatus, the communication control method comprising:

determining a distribution-destination communication path from a plurality of candidate communication paths other than a first communication path included in the plurality of communication paths based on free bandwidths of the respective candidate communication paths; and executing control for distributing a setting flow for the first communication path to the distribution-destination communication path.

(Supplementary note 14)

A communication system comprising:

a first communication apparatus;

a second communication apparatus configured to perform multilink communication simultaneously using a plurality of communication paths, in which one or a plurality of flows are set for each communication path, with the first communication apparatus; and a plurality of transmission apparatuses configured to be located in a plurality of respective communication sections included in the plurality of respective communication paths, wherein each of the transmission apparatuses transmits information about a current available bandwidth for the respectively corresponding communication sections to the first communication apparatus, and the first communication apparatus calculates a free bandwidth of each of the communication paths based on the current available bandwidth transmitted from each of the transmission apparatuses, determines a distribution-destination communication path from a plurality of candidate communication paths other than a first communication path included in the plurality of communication paths based on free bandwidths of the respective candidate communication paths, and executes control for distributing a setting flow for the first communication path to the distribution-destination communication path.

REFERENCE SIGNS LIST

1 COMMUNICATION SYSTEM
10 COMMUNICATION APPARATUS
12 DETERMINATION UNIT
13 PORT
14 FLOW COUNTER
15 PATH MANAGEMENT PROCESSING UNIT
15A MESSAGE PROCESSING UNIT
16 TABLE MANAGEMENT UNIT
17 STORAGE UNIT
17A FORWARDING TABLE
17B MANAGEMENT TABLE
18 BAND CALCULATION UNIT
20 COMMUNICATION APPARATUS
30 TRANSMISSION APPARATUS
31 PORT
32 TRANSFER PROCESSING UNIT
33 WIRELESS COMMUNICATION UNIT
34 TRANSMISSION SCHEME CONTROL UNIT
35 BAND MONITORING UNIT
36 MESSAGE TRANSMISSION PROCESSING UNIT
40 TRANSMISSION APPARATUS

The invention claimed is:

1. A communication apparatus configured to perform multilink communication simultaneously using a plurality of communication paths, in which one or a plurality of flows are set for each communication path, with a communication partner apparatus, the communication apparatus comprising:

hardware, including a processor and a memory;

a distribution control unit that is implemented at least by the hardware and that executes control for distributing a setting flow for a first communication path of a plurality of communication paths to a distribution-destination communication path different from the first communication path;

a determination unit that is implemented at least by the hardware and that determines the distribution-destination communication path from a plurality of candidate communication paths other than the first communication path included in the plurality of communication paths based on free bandwidths of the respective candidate communication paths; and an acquisition unit that is implemented at least by the hardware and that acquires, from a transmission apparatus located in a communication section included in the first communication path, information about a current available bandwidth for the communication section, wherein the distribution control unit calculates the free bandwidth of the first communication path by subtracting a sum of the usage bandwidths of the plurality of flows set to the first communication path from the current available bandwidth.

2. The communication apparatus according to claim 1, wherein the determination unit selects a candidate communication path having the largest free bandwidth among a plurality of candidate communication paths as a distribution-destination communication path.

3. The communication apparatus according to claim 1, wherein the distribution control unit executes control for distributing the setting flow to the distribution-destination communication path based on the free bandwidth of the first communication path.

4. The communication apparatus according to claim 3, wherein the distribution control unit distributes the setting flow to the distribution-destination communication path when the free bandwidth of the first communication path is equal to or less than a predetermined level.

5. The communication apparatus according to claim 3, wherein the distribution control unit determines, based on a usage bandwidth of a flow to be determined of a plurality of flows set to the first communication path and the free bandwidth of the distribution-destination communication path, whether to distribute the flow to be determined to the distribution-destination communication path.

6. The communication apparatus according to claim 5, wherein when the usage bandwidth of the flow to be determined is equal to or less than the free bandwidth of the distribution-destination communication path, the distribution control unit determines to distribute the flow to be determined to the distribution-destination communication path.

7. The communication apparatus according to claim 5, wherein the distribution control unit sequentially selects, as the flow to be determined, a flow having a highest priority from among the plurality of flows set to the first communication path.

8. The communication apparatus according to claim 7, wherein the priority becomes higher as the usage bandwidth becomes larger.

9. The communication apparatus according to claim 7, wherein the priority becomes higher as the usage bandwidth becomes smaller.

10. The communication apparatus according to claim 1, further comprising a plurality of communication ports corresponding to the plurality of respective communication paths.

11. The communication apparatus according to claim 1, wherein the plurality of flows are associated with a VLAN identifier.

12. A communication control method executed by a communication apparatus configured to perform multilink communication simultaneously using a plurality of communication paths, in which one or a plurality of flows are set for each communication path, with a communication partner apparatus, the communication control method comprising:
   determining a distribution-destination communication path from a plurality of candidate communication paths other than a first communication path included in the plurality of communication paths based on free bandwidths of the respective candidate communication paths; and
   executing control for distributing a setting flow for the first communication path to the distribution-destination communication path;
   acquiring, from a transmission apparatus located in a communication section included in the first communication path, information about a current available bandwidth for the communication section; and
   calculating the free bandwidth of the first communication path by subtracting a sum of the usage bandwidths of the plurality of flows set to the first communication path from the current available bandwidth.

13. A communication system comprising:
   a first communication apparatus;
   a second communication apparatus configured to perform multilink communication simultaneously using a plurality of communication paths, in which one or a plurality of flows are set for each communication path, with the first communication apparatus; and
   a plurality of transmission apparatuses configured to be located in a plurality of respective communication sections included in the plurality of respective communication paths, wherein
   each of the transmission apparatuses transmits information about a current available bandwidth for the respectively corresponding communication sections to the first communication apparatus, and
   the first communication apparatus calculates a free bandwidth of each of the communication paths by subtracting a sum of the usage bandwidths of the plurality of flows set to each of the communication paths from the current available bandwidth transmitted from each of the transmission apparatuses, determines a distribution-destination communication path from a plurality of candidate communication paths other than a first communication path included in the plurality of communication paths based on free bandwidths of the respective candidate communication paths, and executes control for distributing a setting flow for the first communication path to the distribution-destination communication path.

* * * * *